United States Patent [19]
Tuson et al.

[11] Patent Number: 6,095,002
[45] Date of Patent: Aug. 1, 2000

[54] SHIFT INTO OPTIMAL ENGINE BRAKING CONTROL SYSTEM AND METHOD

[75] Inventors: John S. Tuson, Leyland; Paul M. Fowler, Lymm, both of United Kingdom

[73] Assignee: Eaton Corporation, Cleveland, Ohio

[21] Appl. No.: 09/127,951

[22] Filed: Aug. 3, 1998

[30] Foreign Application Priority Data

Oct. 16, 1997 [GB] United Kingdom .................... 9721823

[51] Int. Cl.[7] ................................................. F16H 59/48
[52] U.S. Cl. ............................... 74/335; 477/78; 477/118
[58] Field of Search ................................ 74/335, 336 R; 477/78, 107, 118, 199

[56] References Cited

U.S. PATENT DOCUMENTS

| | | | |
|---|---|---|---|
| 4,527,447 | 7/1985 | Richards | 74/336 R |
| 4,631,679 | 12/1986 | Klatt | 364/424.1 |
| 4,765,201 | 8/1988 | Ishiguro et al. | 74/866 |
| 4,933,850 | 6/1990 | Wheeler | 477/119 X |
| 5,193,657 | 3/1993 | Iizuka | 477/186 X |
| 5,393,276 | 2/1995 | White et al. | 477/107 X |
| 5,415,604 | 5/1995 | Bates et al. | 477/78 |
| 5,416,700 | 5/1995 | Bates et al. | 477/115 X |
| 5,419,412 | 5/1995 | Schwab et al. | 74/335 X |
| 5,425,689 | 6/1995 | Genise | 74/335 X |
| 5,506,771 | 4/1996 | Chan et al. | 74/335 X |
| 5,527,237 | 6/1996 | Fowler et al. | 477/78 X |
| 5,577,978 | 11/1996 | Stasik et al. | 477/78 X |
| 5,664,458 | 9/1997 | Stasik et al. | 74/336 R |
| 5,733,219 | 3/1998 | Rettig et al. | 477/107 X |
| 5,754,968 | 5/1998 | Hedstrom | 74/336 R |
| 5,799,539 | 9/1998 | Haase | 74/335 X |
| 5,816,100 | 10/1998 | Fowler et al. | 74/335 |
| 5,823,052 | 10/1998 | Nobumoto | 74/335 |
| 5,828,974 | 10/1998 | Hawarden et al. | 74/335 X |
| 5,842,376 | 12/1998 | Dresden et al. | 74/336 R |
| 5,875,410 | 2/1999 | Fowler et al. | 477/78 X |
| 5,894,758 | 4/1999 | Walker | 74/335 |
| 5,904,635 | 5/1999 | Genise et al. | 74/335 X |

FOREIGN PATENT DOCUMENTS

| | | |
|---|---|---|
| 0270708 | 6/1988 | European Pat. Off. . |
| 0602685 | 6/1994 | European Pat. Off. . |
| 0769640 | 4/1997 | European Pat. Off. . |

*Primary Examiner*—Khoi Q. Ta
*Attorney, Agent, or Firm*—Howard D. Gordon

[57] ABSTRACT

A control system and method for an automated mechanical transmission system (10) including an engine braking mechanism (14A) is provided for allowing operator request for an automatic direct downshift into the selected ratio ($GR_{EB}$) automatically determined to provide optimum engine braking under current vehicle operating conditions. Retaining the control lever (1) in a displaced position for longer than a reference period of time (REF), such as one or two seconds, while the engine brake is active, will initiate the automatic determination and shift into the selected ratio ($GR_{EB}$) determined to provide optimum engine braking under current vehicle operating conditions procedure.

8 Claims, 5 Drawing Sheets

SHIFT INTO OPTIMAL ENGINE BRAKING CONTROL SYSTEM AND METHOD

BACKGROUND OF THE INVENTION

1. Field of the Invention

The present invention relates to a control system and method for an automated transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing allowable driver-selected transmission ratio shifts. More particularly, the present invention relates to a system and method for controlling a semi-automatic mechanical transmission systems wherein movement to and retention of the shift selection lever or other selection device in the upshift or downshift direction or selection position for a first period of time is interpreted as an operator request for a single shift in that direction, and movement to and retention of the shift lever or other selection device in the upshift or downshift direction or selection position for at least a second, longer period of time, while the engine braking system is active, is interpreted as an operator request for a direct shift into a transmission ratio determined to provide optimum engine braking under current vehicle operating conditions.

2. Description of the Prior Art

Fully automatic transmission systems, for both heavy-duty vehicles (such as heavy-duty trucks and/or coaches) and for automobiles, that include sensors for sensing throttle openings or positions, vehicle speeds, engine speeds and the like, and automatically shift the vehicle transmission in accordance therewith, are well known in the prior art. Such fully automatic change-gear transmissions include transmissions wherein pressurized fluid is utilized to frictionally engage one or more members to other members or to a ground to achieve a selected gear ratio and automated mechanical transmissions utilizing electronic, hydraulic, mechanical and/or pneumatic logic and actuators to engage and disengage mechanical (i.e., positive) clutches to achieve a desired gear ratio. Examples of such transmissions may be seen by reference to U.S. Pat. No. 3,961,546; 4,081,065; 4,361,060; 5,050,079 and 5,109,729, the disclosures of which are incorporated herein by reference.

For many vehicles, vehicle operators like to control the selection of the gear ratios, particularly since they can see and/or know the nature of the road ahead and/or of the load being carried. This is accomplished by providing a semi-automatic mechanical transmission control wherein automatic changing between a plurality of gear ratios is provided, while normally permitting the driver to choose when to make a particular gear ratio change and whether to select the immediately consecutive ratio up or down or, by repetitive selection to skip one or more ratios. Examples of such a semi-automatic transmission control can be seen by reference to U.S. Pat. No. 4,648,290; 4,800,360; 4,930,081; 5,385,515 and 5,406,861, the disclosures of which are incorporated herein by reference.

While the above-described semi-automatic mechanical transmission control does provide a very desirable semi-automatic control, the control was subject to improvement. Selection of a direct single or skip shifts by repetitive pulses or movements of the shift selection lever is highly advantageous, however, the need to calculate the particular required ratio for a given set of operating conditions, the number of required movements, and of performing same, may be somewhat burdensome. This was particularly a concern in modern mechanical transmissions for heavy-duty vehicles which may have 9, 10, 12, 13, 16 or 18 forward speed ratios. Examples of such multi-speed mechanical transmissions may be seen by reference to U.S. Pat. Nos. 4,648,290; 4,735,109; 4,754,665 and 5,390,561, the disclosures of which are incorporated herein by reference.

U.S. Pat. No. 5,385,515; 5,406,861 and 5,416,700, the disclosures of which are incorporated herein by reference, a control and control method responsive to retention of the shift selector in a given direction of displacement to cause the transmission to remain in the currently engaged ratio and a display to scroll in the given direction through the allowable engageable ratios and, upon release of the shift selection lever to the centered position, will perform a direct shift from the currently engaged ratio to the displayed ratio.

Systems wherein the operator could request a shift into a particular ratio to optimize a required performance by use of an additional selector are known. These systems are not totally satisfactory as an additional selector, additional connectors and the like are required.

SUMMARY OF THE INVENTION

In accordance with the present invention, there is provided a control system and method for semi-automated mechanical transmission systems of the type described above, which interprets extended selection of at least one of upshifts or downshifts under certain predetermined vehicle operating conditions, including actuation of the engine braking function, as a driver request for the system to determine a transmission ratio that will provide maximum engine braking under current vehicle operating conditions and for a direct shift into the transmission ratio that is determined to provide optimum engine braking. Accordingly, the drawbacks of the prior art are overcome by a control system/method which allows operator selection of automatic determination of a ratio providing optimized engine braking, and a direct shift into that ratio, all without requiring additional selection devices, connections and the like.

This and other objects and advantage of the present invention will become apparent from a reading of the detailed description of the preferred embodiment taken in connection with the attached drawings.

DESCRIPTION OF THE PREFERRED EMBODIMENT

Figure 1:
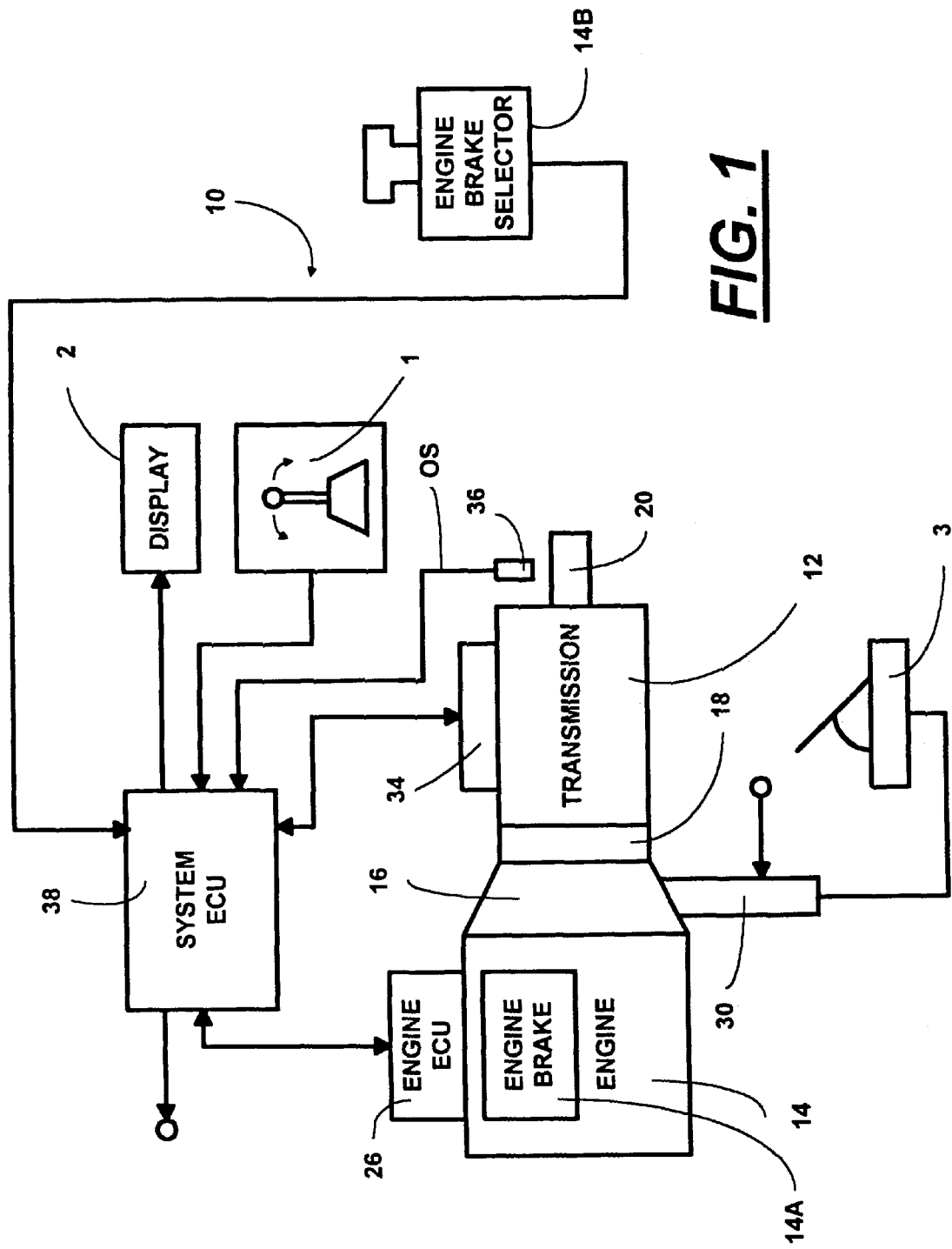
FIG. 1 is a schematic illustration of the semi-automatic mechanical change-gear transmission system of the present invention.

Certain terminology will be used in the following description for convenience in reference only and is not limiting.

The terms "upwardly," "downwardly," "rightwardly" and "leftwardly" designate directions in the drawings to which reference is made. The words "inwardly" and "outwardly" will refer, respectively, to directions toward and away from the geometric center of a device and designated parts thereof. The foregoing applies to the words specifically mentioned, derivatives thereof and words of similar import.

The term "simple transmission" is used to designate a change-speed transmission, wherein the operator may select one of a plurality of single gear reductions. The term "compound transmission" is used to designate a change-speed transmission having a main transmission portion and an auxiliary transmission portion connected in series whereby the selected gear reduction in the main transmission portion may be compounded by further selected gear reduction in the auxiliary transmission portion. The term "splitter-type compound transmission," as used herein, will designate a compound transmission wherein the auxiliary transmission is used to provide various selectable steps for subdivisions of the gear ratio selected in the main transmission portion. In a splitter-type compound transmission, the main transmission section is typically provided with relatively wide steps which are split or subdivided by the auxiliary section. The term "range-type compound transmission," as used herein, refers to a compound transmission having an auxiliary section with a relatively large step, as compared to the ratio steps of the main transmission section. The term "upshift," as used herein, shall mean the shifting from a lower speed gear ratio into a higher speed gear ratio. The term "downshift," as used herein, shall mean the shifting from a higher speed gear ratio to a lower speed gear ratio. The terms "low speed gear," "low gear" and/or "first gear," as used herein, shall all designate the gear ratio utilized for lowest forward speed operation in a transmission or transmission section (i.e., that set of gears having the highest ratio of reduction relative to the input shaft of the transmission).

A "selected direction" of shifting will refer to selection of either single or multiple upshifting or downshifting from a particular gear ratio. The "displacement" between ratios refers to the number of selectable ratios between two given ratios; for example, third speed or gear ratio is displaced by one and two ratios, respectively, from fourth and fifth speed, respectively, in the downshift direction.

The present invention is applicable, in principle, to the control of any type of mechanical change-gear transmission adaptable for providing output signals to and receiving command signals from various electric, electronic, mechanical and/or fluid-operated control and/or sensing devices. However, the control system of the present invention is particularly advantageously applied to a compound transmission of the type having a non-synchronized main transmission section connected in series with at least one auxiliary section of the splitter, range and/or combined splitter/range type. Such transmissions are known in the prior art and are described and illustrated in aforementioned U.S. Pat. No. 4,735,109; 4,648,290; 4,754,665 and 5,390,561. The transmission system may be coupled to a power unit through a conventional friction clutch, torque converter or other convenience power coupling means.

Referring to FIG. 1, information concerning the engine is communicated from the engine control ECU 26 to the processing unit 38. Communication may be over an electronic data link of the type confirming to SAE J1922, SAE J1939, ISO 11898 or other applicable standard. The processing unit 38 may also receive inputs relative to engine speed or transmission input shaft speed from appropriate sensors, transmission output shaft speed from sensor 36, and upshift or downshift actuations of the driver's gear shift lever, or "joy stick" 1, to be described in greater detail below. It is understood that transmission output shaft speed is an indication of vehicle ground speed and engine speed is an indication of transmission input shaft speed, and vice versa, especially if clutch 16 is non-slippingly engaged, while transmission output shaft speed is an indication of vehicle speed.

The engine 14 is provided with an engine braking mechanism 14A, such as a compression brake, an exhaust brake, a Jake brake or the like, which may be activated by a selector 14B. Selector 14B may be manually and/or automatically controlled.

The present invention is equally applicable to systems where the control of the engine is achieved by mechanical methods. A suitable throttle position sensor and throttle pedal or "remote fuel control" or "fly-by-wire" system are known in the prior art and are illustrated by U.S. Pat. Nos. 4,250,845; 4,305,359; 4,319,658 and 4,461,254, the disclosures of which are incorporated herein by reference.

Control logic circuits, sensors and actuators for the transmission system 10, as disclosed in FIG. 1, may be as disclosed in aforementioned U.S. Pat. No. 4,361,060; 4,648, 290; 4,930,081 and 4,930,078. Specifically, processing unit 38 receives inputs, processes same in accordance with predetermined logic rules, and provides command output signals to pneumatic and/or electrical actuators for control of an input shaft brake 18 for rapid upshifts, and engine fuel control or alternatively an engine ECU 26 to "blip" or "dip" the engine 14 to achieve rapid synchronous rotation preparatory to a downshift or upshift, respectively, clutch control via operator 30, and ratio shifting via transmission operator 34. The transmission operator 34 also may be of the "X-Y" type, as illustrated in U.S. Pat. Nos. 4,873,881 and 4,899, 607, the disclosures of which are incorporated herein by reference.

The processing unit also sends command output signals to the display 2, to be described in greater detail below. The semi-automatic transmission system 10 may additionally comprises a typical foot-operated manual clutch control 3 intended for use only for start-from-rest and/or low speed creeping maneuvering situations. The processing unit 38 receives signals indicative of manual clutch control 3 position and of actuation of the vehicle brakes 4. Alternatively, the clutch pedal may be eliminated and the operation of the clutch fully automated under the control of the processing unit 38. The semi-automatic mechanical transmission system 10 also includes sources of electric and/or pneumatic power (not illustrated).

The processing unit may be of the type illustrated in U.S. Pat. No. 4,595,986 and may incorporate fault detection and tolerance logic of the type illustrated in U.S. Pat. Nos. 4,849,899; 4,899,279 and 4,945,484.

As used herein, the term "blip" designates a temporary increase in the supply of fuel to the engine 14, while the term "dip" means a momentary decrease in supply of fuel to the engine. Such terms usually are associated with engine fuel control or ECU 26 commanded increases and decreases, respectively, of the supply of fuel to the engine, independent of the operator-selected position of the throttle pedal.

The processing unit 38 may be located in a single box or may in fact be distributed across a number of sites on the vehicle, one of which could be on the transmission housing itself, another of which could be in or near the cab. The processing unit 38 will be connected to a display of the type shown in FIG. 2A. Alternatively, the processing unit may be incorporated into the engine ECU 26.

Figure 2:
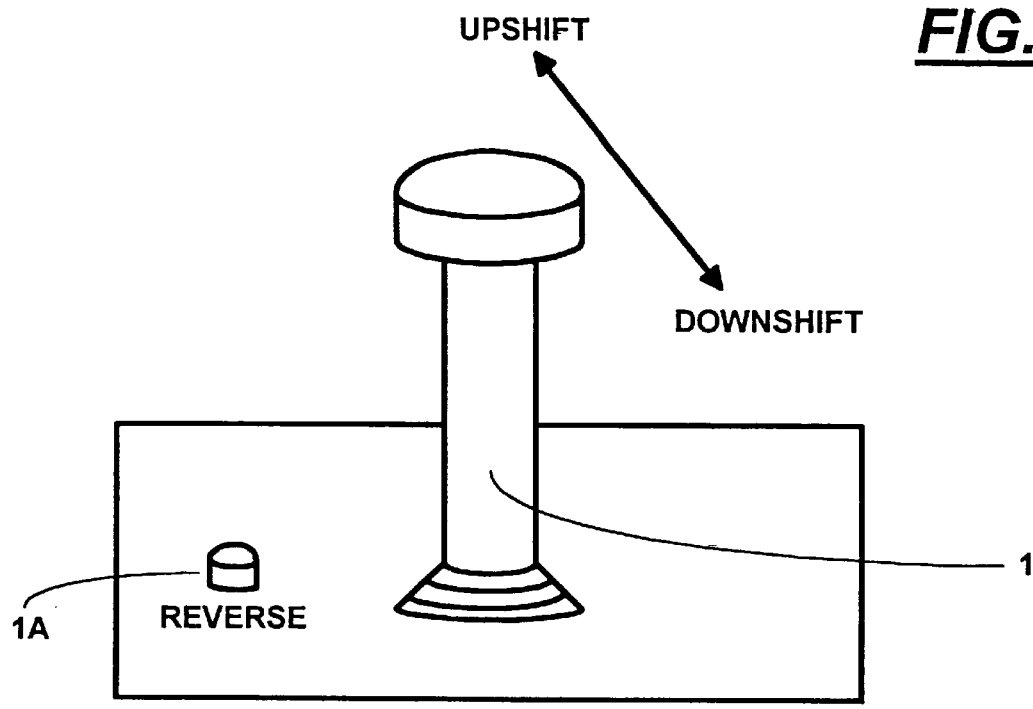
FIG. 2 is a perspective view of the driver's manual shift control.

The selector means may be a selector lever or buttons or toggle or any other suitable device or combination of devices. Such levers or other devices have been mounted on the vehicle dashboard or fascia but are more conveniently mounted on the steering column in the same way as other known steering column switches. It is possible that the selector means could be mounted as one or more pairs of buttons (see FIG. 2B) or a toggle (see FIG. 2C) on the steering wheel itself. Such buttons might be similar in size, shape and operation to known remote controls for radios or other audio systems.

Figure 2A:
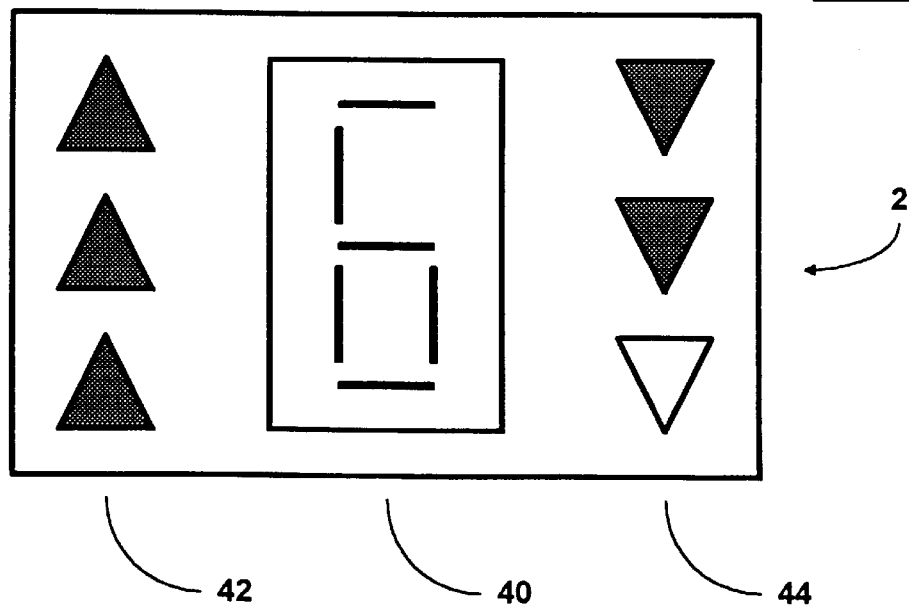
FIG. 2A is an enlarged view of the preferred display.
Figure 2B:
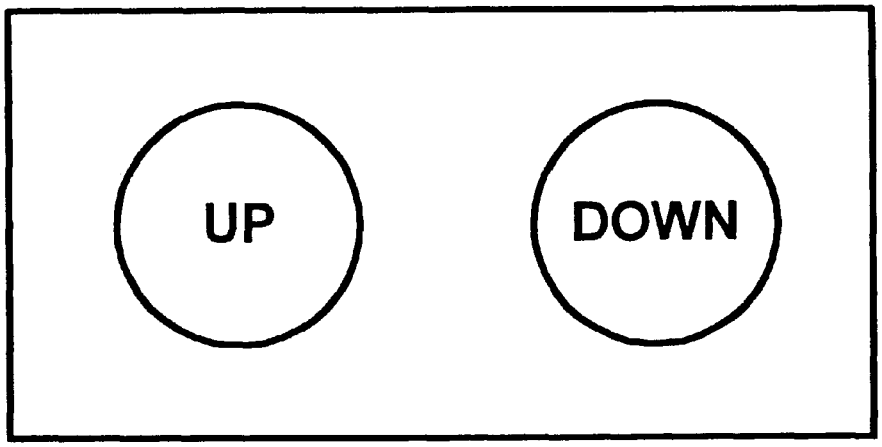
FIG. 2B is an enlarged view of an alternate selection device.
Figure 2C:
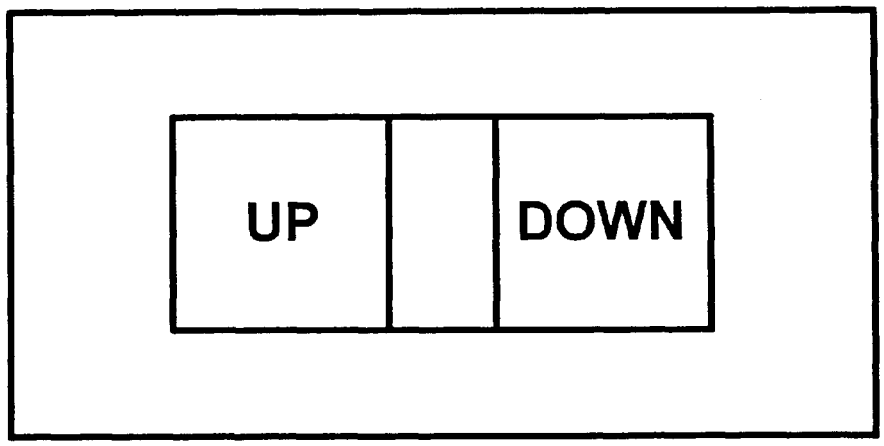
FIG. 2C is an enlarged view of another alternate selection device.

Referring to FIG. 2A, the display 2 includes upshift indicator section 42, downshift indicator section 44, and currently engaged gear ratio indicator section 40. As illustrated, the currently engaged gear ratio display section 40 is presently displaying a "6," indicating that the vehicle transmission is operating in sixth gear. The upshift display section 42 has three lit arrows indicating the maximum number of consecutive upshifts permitted according to the sensed input parameters, such as sensed engine or input shaft speed and sensed output shaft speed as processed according to the predetermined logic rules or program. In the present situation, the three lit arrows indicate that a single, double or triple upshift is permissible. Accordingly, the driver may select a permissible shift directly to either seventh, eighth or ninth speed. The downshift display section 44 has two lit arrows indicating the maximum number of consecutive downshifts permitted according to the sensed parameters as processed by the predetermined logic or program. In the present situation, the two lit arrows in display section 44 indicate that the transmission may be permissibly downshifted to either fifth or to fourth gear.

The processing unit 38 will not issue command signals to execute a selected but impermissible ratio change. Preferably, the processing unit will execute the closest permissible ratio change to that selected by the operator. By way of example, assuming the conditions indicated by display 2, as illustrated in FIG. 2A, should the operator select a downshift to third gear, such a downshift will not be executed by the processing unit 38 as being impermissible. However, in the preferred embodiment, the processing unit 38 will issue command output signals for a double downshift from sixth gear to fourth gear. Not only is an impermissible ratio change refused, but the driver usually already will have been advised by display 2 that the ratio should never have been attempted or selected.

The display 2 provides an indication to the operator of which upshifts and downshifts are permissible and as to which upshifts and downshifts are impermissible. Should the driver not heed the warning, the processing unit 38 will not generate impermissible shift command, even though synchronization of the mechanical jaw clutch elements could be obtained by the system.

To shift transmission 12, the driver moves lever 1 forward (for upshifts) and rearward (for downshifts) from the position illustrated in FIG. 2. To select a single upshift (i.e., a shift to seventh gear), the operator will move lever 1 forward once and the lever will then return to the neutral or centered position under bias. If, in sixth gear as shown, the operator moves the lever forward from the non-displaced position three times in quick succession and then allows its return to rest, he will skip two gears, in effect, and achieve a skip shift directly into ninth speed (i.e., seventh and eighth speeds will not be engaged) almost instantaneously. In the preferred embodiment of the present invention, the declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up- or downshift, and as to how many gear ratios to up- or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the processing unit 38 in conjunction with engine fuel control or ECU 26.

The reverse mode of operation may be achieved only from the neutral, at-rest position and then is achieved by moving control lever 1 backward from the currently engaged neutral position. To prevent an inadvertent "downshift" into reverse, a reverse button 1A may be provided, which button must be depressed prior to the processing unit's interpreting a backward movement of the control lever 1, when in the neutral position, as a request for reverse operation. Other methods of preventing inadvertent operation of reverse gear may be applicable. One example is any type of toggle switch or button, which may be located on the end of the shift lever, may be utilized in place of reverse enable button 1A.

Upshifts and/or downshifts involving both the main and auxiliary section (i.e., compound shifts) are equally simple for the driver to achieve as those involving only the auxiliary section (i.e., a split shift). In those transmissions provided with multiple reverse gear ratios, the transmission may be downshifted into lower reverse ratios and upshifted into higher reverse ratios by movement of the control lever backward and forward as indicated.

A single movement or pulse of the lever 1 is a movement of the lever from the centered or non-displaced/non-selected position to a displaced or selection position, in either the upshift or downshift direction, and then the immediate release of the lever, allowing the lever to return to the centered or non-displaced/non-selected position thereof. If the control lever 1 is retained in the displaced or selection position for more than a predetermined period of time (for example, for more than 0.5 to 1.0 seconds, or for more than one or two seconds), an alternative control logic is utilized.

Figure 3A:
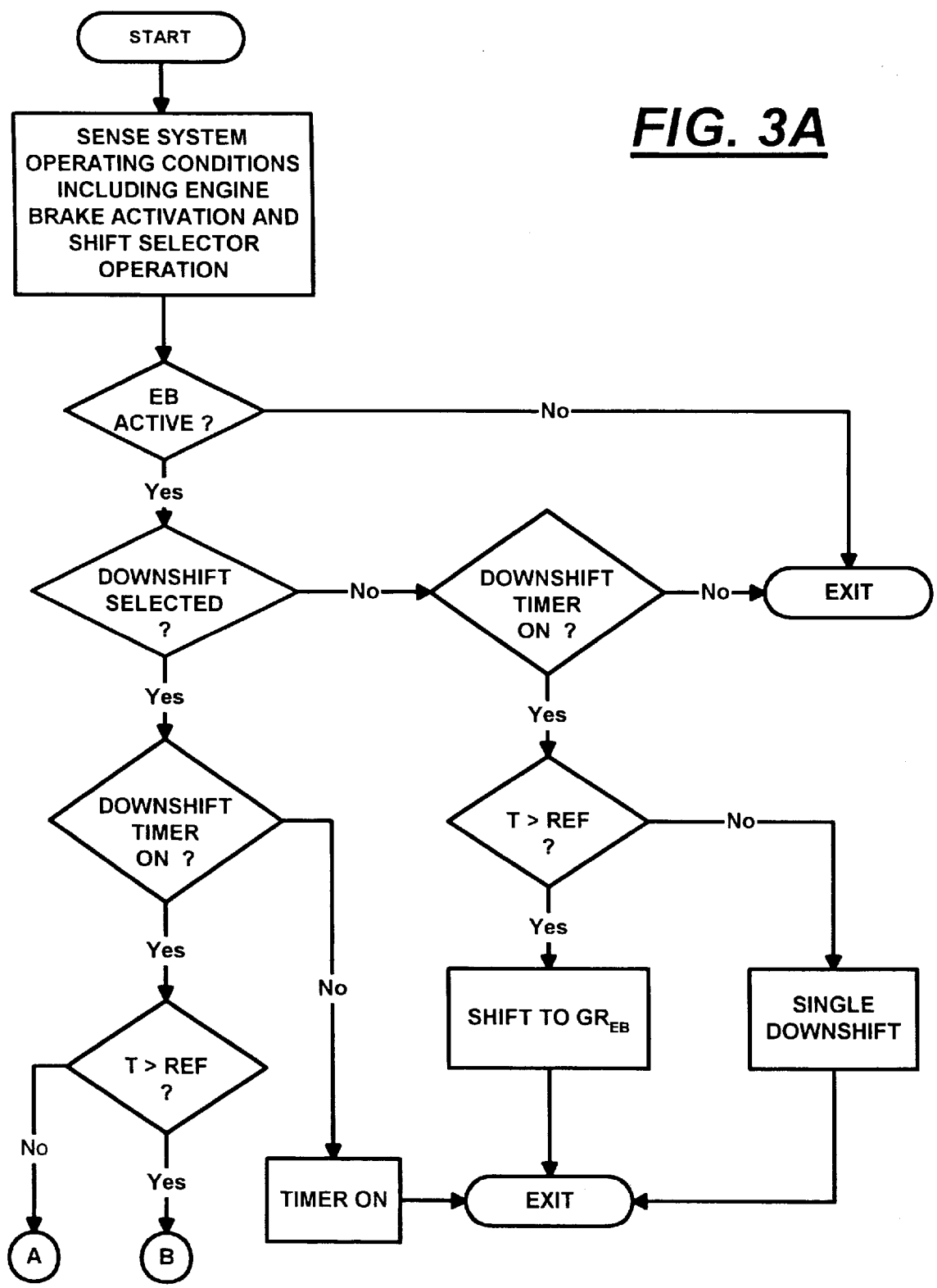
FIGS. 3A, and 3B are schematic illustrations in flow chart format of the control system/method of the present invention.
Figure 3B:
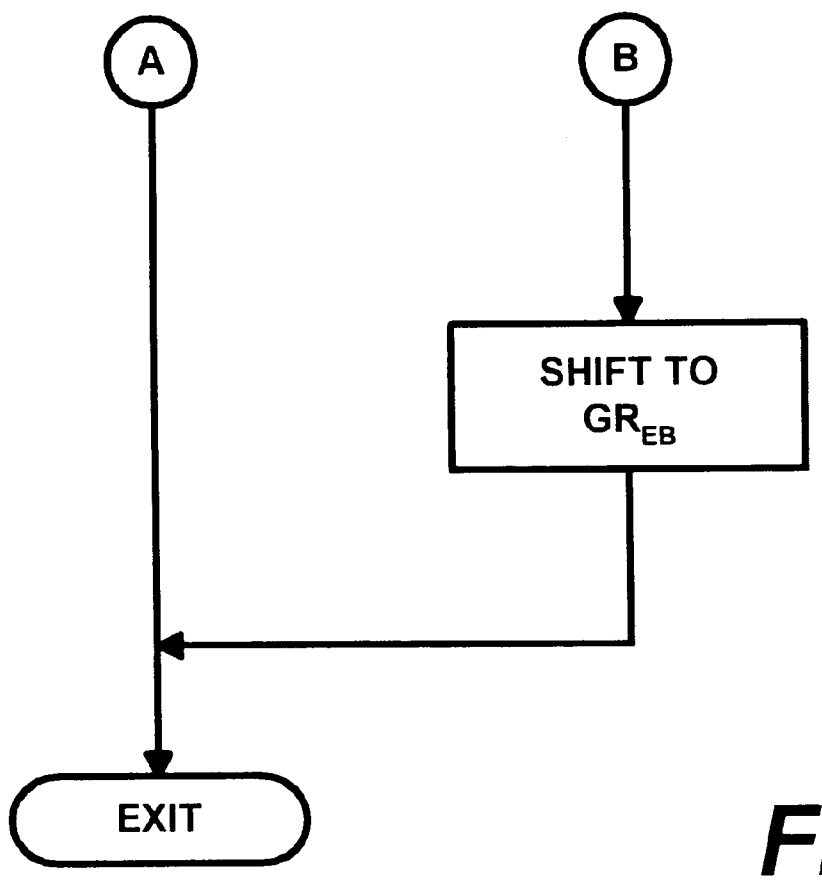

According to the present invention, as illustrated in FIGS. 3A, and 3B, if the operator retains the shift selection lever 1 or other selection device in a selection position for selecting a shift a given shift direction (preferably the downshift direction) for greater than a reference time (such as one or two seconds), and if the engine brake is active, the ECU will determine the transmission ratio which will provide optimal engine braking under current vehicle operating conditions ($GR_{EB}$) and, if necessary, will command a direct shift into that ratio.

By this procedure, with a single movement to, and retention of the control lever in the selection position, in a given direction (i.e., the downshift direction), the vehicle operator can request automatic implementation of a direct shift, if necessary, into the optimal engine braking transmission ratio ($GR_{EB}$). This is accomplished without the need for additional selection devices, connections or the like.

Although the present invention has been described with a certain degree of particularity, it is understood that various modifications are possible without departing from the spirit and the scope of the invention as hereinafter claimed.

We claim:

1. A system for controlling a semi-automatic mechanical change-gear transmission system (10) comprising a fuel controlled engine (14) having a selectively actuated engine braking mechanism (14A), an engine braking selection device (14B) for selectively actuating and deactivating the engine brake mechanism, a multiple-speed, change-gear mechanical transmission (12), a manually operated shift selection device (1) for selecting upshifts and downshifts, and a processing unit (38) for receiving inputs, including inputs indicative of operation of said engine braking selection device and said shift selection device, and for processing same according to predetermined logic rules to determine currently engaged and allowably engaged gear ratios and to issue command output signals to operators including a transmission operator (34), said processing unit sensing operation of said engine braking selection device and said manually operated shift selection device, including selection of an upshift or a downshift and duration of a selection operation, said logic rules including rules effective for determining a transmission gear ratio, selected by a driver, to be shifted directly into from the currently engaged ratio, by assuming that driver selection of a shift in a shift direction for a time duration less than a reference period of time indicates driver selection of a change of one ratio in said shift direction; said system characterized by:

said logic rules including rules for assuming that a selection of a downshift for a time duration exceeding said reference period of time, while said engine brake mechanism is activated, indicates driver selection of (1) a determination of a transmission ratio determined to provide maximum engine braking under current vehicle operating conditions ($GR_{EB}$) and (2) shifting into said transmission ratio determined to provide maximum engine braking without overspeeding the engine under current vehicle operating conditions.

2. The system of claim 1 wherein said logic rules further include rules for automatically implementing allowable driver selection of shifts.

3. The system of claims 1 or 2, wherein said reference period of time is in the range of 0.5 to 2.0 seconds.

4. The system of claims 1 or 2, wherein said reference period of time is in the range of 1.0 to 2.0 seconds.

5. A method of controlling an automated mechanical change-gear transmission system (10) comprising a fuel controlled engine (14) having a selectively actuated engine braking mechanism (14A), an engine braking selection device (14B) for selectively actuating and deactivating the engine braking mechanism, a multiple-speed, change-gear mechanical transmission (12), a manually operated shift selection device (1) for selecting upshifts and downshifts, and a processing unit (38) for receiving inputs, including inputs indicative of operation of said shift selection device, and for processing same according to predetermined logic rules to determine currently engaged and allowably engaged gear ratios and to issue command output signals to operators including a transmission operator (34), said processing unit sensing operation of said engine braking selection device and said manually operated shift selection device, including selection of an upshift or a downshift and duration of a selection operation, said method comprising the steps of:

determining a transmission gear ratio selected by a driver to be shifted directly into from the currently engaged ratio, by assuming that driver operation of said shift selection device for selection of a downshift for a time duration less than a reference period of time indicates driver selection of a one ratio downshift; and assuming that driver operation of said shift selection device for selection of a downshift for a time duration exceeding said reference period of time, while said engine braking mechanism is activated, indicates driver selection of (1) a determination of a transmission ratio determined to provide maximum engine braking under current vehicle operating conditions ($GR_{EB}$) and (2) shifting directly into said transmission ratio determined to provide maximum engine braking without overspeeding the engine under current vehicle operating conditions.

6. The method of claim 5 further comprising the step of automatically implementing allowable operator selection of shifts.

7. The method of claims 5 or 6, wherein said reference period of time is in the range of 0.5 to 2.0 seconds.

8. The method of claims 5 or 6, wherein said reference period of time is in the range of 1.0 to 2.0 seconds.

* * * * *